(12) United States Patent
Maeda

(10) Patent No.: US 8,730,501 B2
(45) Date of Patent: May 20, 2014

(54) COMMUNICATION APPARATUS, COMMUNICATION CONTINUATION METHOD, AND COMMUNICATION CONTINUATION PROGRAM

(75) Inventor: Toshihiro Maeda, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 50 days.

(21) Appl. No.: 13/045,205

(22) Filed: Mar. 10, 2011

(65) Prior Publication Data

US 2011/0228327 A1  Sep. 22, 2011

(30) Foreign Application Priority Data

Mar. 19, 2010 (JP) ................................. 2010-064933

(51) Int. Cl.
*G06F 3/12* (2006.01)

(52) U.S. Cl.
USPC ......... 358/1.15; 358/1.14; 713/310; 713/320; 713/323; 713/324

(58) Field of Classification Search
USPC ......... 358/1.14, 1.15; 713/310, 320, 323, 324
See application file for complete search history.

(56) References Cited

U.S. PATENT DOCUMENTS

| 7,058,829 | B2* | 6/2006 | Hamilton | 713/320 |
|---|---|---|---|---|
| 7,555,662 | B2 | 6/2009 | Kidoguchi | |
| 7,859,693 | B2 | 12/2010 | Ueno et al. | |
| 2002/0109857 | A1* | 8/2002 | Ueno et al. | 358/1.14 |
| 2002/0178389 | A1* | 11/2002 | Satoh | 713/310 |
| 2004/0057069 | A1* | 3/2004 | Ikeda | 358/1.14 |
| 2005/0179935 | A1* | 8/2005 | Ogura et al. | 358/1.14 |
| 2006/0236143 | A1* | 10/2006 | Kidoguchi | 713/320 |

FOREIGN PATENT DOCUMENTS

| JP | 2002-244834 | 8/2002 |
|---|---|---|
| JP | 2005-074928 | 3/2005 |
| JP | 2006-259906 | 9/2006 |

OTHER PUBLICATIONS

Notice of Ground of Rejection mailed Mar. 21, 2012, directed to Japanese Patent Application No. 2010-064933; 7 pages.

* cited by examiner

*Primary Examiner* — Allen H Nguyen
(74) *Attorney, Agent, or Firm* — Osha Liang LLP

(57) ABSTRACT

A communication apparatus connected to a network to be able to communicate with another device includes a first control portion to communicate with another device connected to the network, and a second control portion to be driven in response to input of a reset signal from the first control portion and to communicate with another device through the first communication portion. The first control portion includes a detection portion to detect data transmitted from another device to the communication apparatus, a data storage portion to store the data to the communication apparatus, and a reset portion to output the reset signal to the second control portion in response to detection of the data to the communication apparatus. The second control portion includes a stop portion to stop driving of the second control portion when a predetermined condition is met, and a network communication portion to communicate with another device based on the detected data to the communication apparatus. One of the first control portion and the second control portion further includes a communication continuation portion to transmit data including a reply for continuing communication with another device, based on the detected data to the communication apparatus, until the network communication portion becomes able to communicate with another device. After becoming able to communicate with another device, if data is stored in the data storage portion, the network communication portion further communicates with another device based on the stored data.

20 Claims, 9 Drawing Sheets

F I G. 1
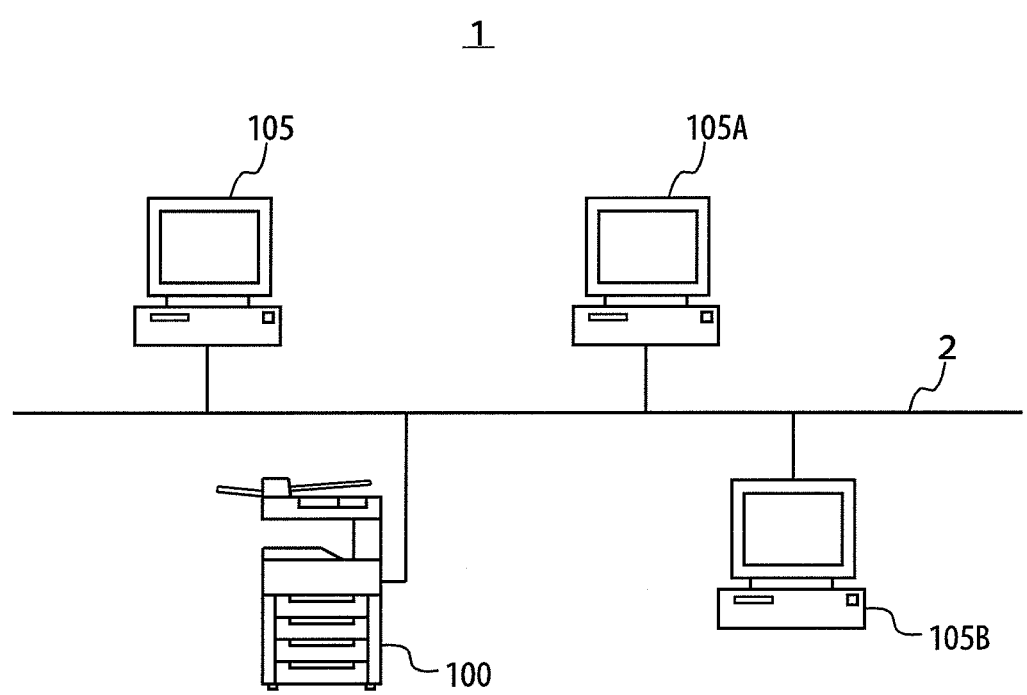

FIG. 5

```
POST /OpenAPI HTTP/1.1
Host: 150.17.150.27:50001
Content-Length: 1234
Content-Type: text/xml; Charset="utf-8"
SOAPAction:"http://www.konicaminolta.com/service/ExtOpenAPI#AppReqExtSetApplication
{CR}{LF}

<e:Envelope xmlns: e="http://schemas.xmlsoap.org/soap/envelope/"
            e:encodingStyle="http://schemas.xmlsoap.org/soap/encoding/">

</e:Envelope>
```

FIG. 6

```
HTTP/1.1 102 Processing
Content-Length: nnnn
Content-Type: text/xml; charset="utf-8"
{CR}{LF}
```

FIG. 7

```
HTTP/1.1 200 OK
Content-Length: nnnn
Content-Type: text/xml; charset="utf-8"
{CR} {LF}

<e:Envelope xmlns: e="http://schemas.xmlsoap.org/soap/envelope/"
            e:encodingStyle="http://schemas.xmlsoap.org/soap/encoding/">

</e:Envelope>
```

F I G. 9
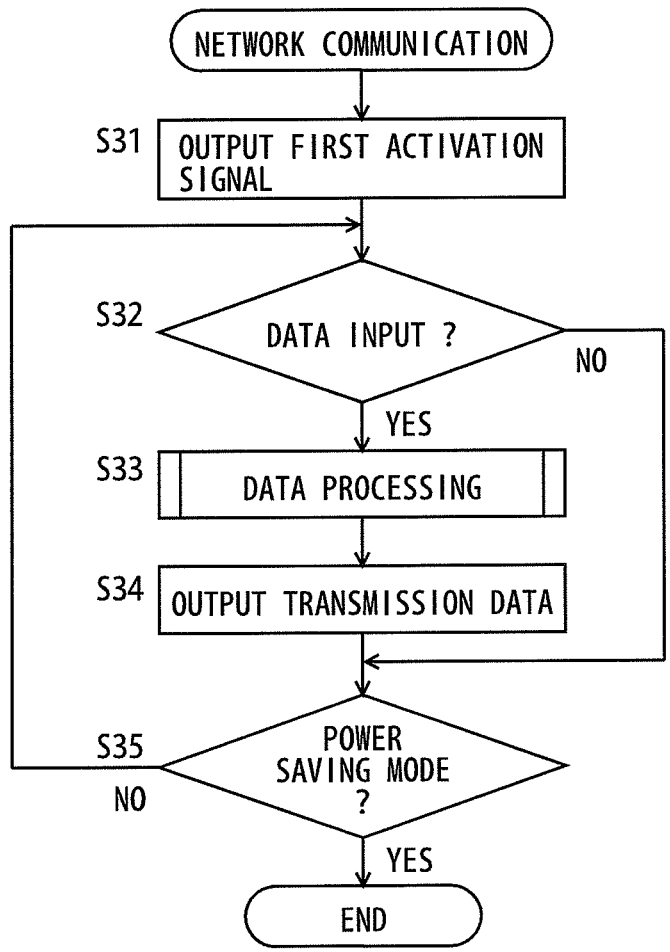

COMMUNICATION APPARATUS, COMMUNICATION CONTINUATION METHOD, AND COMMUNICATION CONTINUATION PROGRAM

This application is based on Japanese Patent Application No. 2010-0064933 filed with Japan Patent Office on Mar. 19, 2010, the entire content of which is hereby incorporated by reference.

BACKGROUND OF THE INVENTION

1. Field of the Invention

The present invention relates to a communication apparatus, a communication continuation method, and a communication continuation program. More particularly, the present invention relates to a communication apparatus with reduced power consumption, and a communication continuation method and a communication continuation program executed in the communication apparatus.

2. Description of the Related Art

In recent years, MFP (Multi Function Peripheral) including printer, copier, and facsimile functions has to be driven only at the request for a process such as printing, copy, facsimile transmission/reception, and is on standby waiting for a request when no process is being executed. During standby, minimizing power consumption is desired while it is also desired to execute a process immediately in response to a request.

MFP is often connected with a network such as a local area network (hereinafter referred to as "LAN") and includes a communication apparatus for connecting to the network. Reduction in power consumption is likewise desired in the communication apparatus.

When MFP is on standby and power supply to the communication apparatus is cut off in order to reduce power consumption, MFP cannot respond to access, for example, from a computer connected to the network. Therefore, the computer that has made access determines that MFP is powered off, and changes the settings of the network environment to a state in which MFP is not connected to the network. Therefore, Japanese Laid-Open Patent Laid-Open No. 2005-74928 discloses a data processing system including a data processing apparatus having a communication buffer for temporarily storing incoming external data, and at least one data transmission apparatus transmitting data to the data processing apparatus. The data processing apparatus includes a data-specifying information extracting means for extracting and holding data-specifying information from the incoming data in a power saving mode and a data retransmission request means for transmitting a retransmission request signal including the extracted data-specifying information to the data transmission apparatus when shifting to a normal mode. The data transmission apparatus includes a data retransmission means for receiving the retransmission signal to retransmit reception data specified by the data-specifying information included in the retransmission signal.

However, in the conventional data processing system, the data transmission apparatus changes the settings of the network environment to a state in which the data processing apparatus is not connected. Accordingly, in order for the data transmission apparatus to receive the retransmission request signal, a new process is required to return the settings of the network environment of the data transmission apparatus to the original settings. Moreover, when receiving the retransmission request, the data transmission apparatus has to retransmit data specified by the data-specifying information. Therefore, the same data is sent twice, so that the load on the data transmission request is increased and the network resource is wasted.

SUMMARY OF THE INVENTION

In accordance with one aspect of the present invention, a communication apparatus connected to a network to be able to communicate with another device includes a first control portion to communicate with another device connected to the network, and a second control portion to be driven in response to input of a reset signal from the first control portion and to communicate with another device through the first communication portion. The first control portion includes a detection portion to detect data transmitted from another device connected to the network to the communication apparatus, a data storage portion to store the data to the communication apparatus detected by the detection portion, and a reset portion to output the reset signal to the second control portion in response to detection of the data to the communication apparatus by the detection portion. The second control portion includes a stop portion to stop driving of the second control portion when a predetermined condition is met, and a network communication portion to communicate with another device based on the data to the communication apparatus detected by the detection portion. One of the first control portion and the second control portion further includes a communication continuation portion to transmit data including a reply for continuing communication with another device, based on the data to the communication apparatus detected by the detection portion, until the network communication portion becomes able to communicate with another device. After becoming able to communicate with another device, if data is stored in the data storage portion, the network communication portion further communicates with another device based on the stored data.

In accordance with another aspect of the present invention, a communication apparatus connected to a network to be able to communicate with another device includes: a detection portion to detect data transmitted from another device connected to the network to the communication apparatus; a mode switching portion to switch an operation mode to a power saving mode in which power consumption is smaller than in a normal mode if a predetermined condition is met while the operation mode is switched to the normal mode, and to switch the operation mode to the normal mode if the detection portion detects reception of data to the communication apparatus while the operation mode is switched to the power saving mode; a network communication portion to stop being driven while the operation mode is switched to the power saving mode, and to be activated when the detection portion detects reception of data to the communication apparatus, and then to communicate with another device, based on the data detected by the detection portion, after becoming able to communicate with another device; a data storage portion to store the data to the communication apparatus detected by the detection portion until the network communication potion becomes able to communicate with another device; and a communication continuation portion to transmit data including a reply for continuing communication with another device, based on the data to the communication apparatus detected by the detection portion, until the network communication portion becomes able to communicate with another device. After becoming able to communicate with another device, if data is stored in the data storage portion, the network communication portion further communicates with another device based on the stored data.

In accordance with a further aspect of the present invention, a communication continuation method is executed in a communication apparatus connected to a network to be able to communicate with another device. The communication apparatus includes a first control portion to communicate with another device connected to the network, and a second control portion to be driven in response to input of a reset signal from the first control portion and to communicate with another device through the first control portion. The method allows the first control portion to execute: a detection step of detecting data transmitted to the communication apparatus from another device connected to the network; a data storage step of storing the data to the communication apparatus detected in the detection step; and a reset step of outputting a reset signal to the second control portion in response to detection of the data to the communication apparatus in the detection step. The method allows the second control portion to execute: a step of stopping being driven in response to that a predetermined condition is met; and a network communication step of communicating with another device based on the data to the communication apparatus detected in the detection step. The method allows one of the first control portion and the second control portion to further execute a step of transmitting data including a reply for continuing communication with another device, based on the data to the communication apparatus detected in the detection step, until communication with another device is enabled in the network communication step. After being driven, if data is stored in the data storage step, the network communication step includes a step of communicating with another device based on the stored data.

In accordance with yet another aspect of the present invention, a communication continuation method is executed in a communication apparatus connected to a network to be able to communicate with another device. The method includes: a detection step of detecting data transmitted from another device connected to the network to the communication apparatus; a mode switching step of switching an operation mode to a power saving mode in which power consumption is smaller than in a normal mode, if a predetermined condition is met while the operation mode is switched to the normal mode, and switching the operation mode to the normal mode if reception of data to the communication apparatus is detected in the detection step while the operation mode is switched to the power saving mode; a network communication step of stopping while the operation mode is switched to the power saving mode, and, if reception of data to the communication apparatus is detected in the detection step, communicating with another device based on the data detected in the detection step; a data storage step of storing the data to the communication apparatus detected in the detection step until communication with another device is enabled in the network communication step; and a communication continuation step of transmitting data including a reply for continuing communication with another device, based on the data to the communication apparatus detected in the detection step, until communication with another device is enabled in the network communication step. After being driven, if data is stored in the data storage step, the network communication step includes a step of communicating with another device based on the stored data.

In accordance with a still further aspect of the present invention, a non-transitory computer-readable recording medium is encoded with a communication continuation program causing a computer which controls a communication apparatus connected to a network to be able to communicate with another device. The communication apparatus includes a first control portion to communicate with another device connected to the network, and a second control portion to be driven in response to input of a reset signal from the first control portion and to communicate with another device through the first control portion. The program causes the computer to execute processing comprising the steps of: allowing the first control portion to execute a detection step of detecting data transmitted to the communication apparatus from another device connected to the network, a data storage step of storing the data to the communication apparatus detected in the detection step, and a reset step of outputting a reset signal to the second control portion in response to detection of the data to the communication apparatus in the detection step; allowing the second control portion to execute a step of stopping being driven in response to that a predetermined condition is met, and a network communication step of communicating with another device based on the data to the communication apparatus detected in the detection step; and allowing one of the first control portion and the second control portion to further execute a step of transmitting data including a reply for continuing communication with another device, based on the data to the communication apparatus detected in the detection step, until communication with another device is enabled in the network communication step. After being driven, if data is stored in the data storage step, the network communication step includes a step of communicating with another device based on the stored data.

In accordance with another aspect of the present invention, a non-transitory computer-readable recording medium is encoded with a communication continuation program executed in a computer which controls a communication apparatus connected to a network to be able to communicate with another device. The program causes the computer to execute processing comprising: a detection step of detecting data transmitted from another device connected to the network to the communication apparatus; a mode switching step of switching an operation mode to a power saving mode in which power consumption is smaller than in a normal mode, if a predetermined condition is met while the operation mode is switched to the normal mode, and switching the operation mode to the normal mode if reception of data to the communication apparatus is detected in the detection step while the operation mode is switched to the power saving mode; a network communication step of stopping while the operation mode is switched to the power saving mode, and, if reception of data to the communication apparatus is detected in the detection step, communicating with another device based on the data detected in the detection step; a data storage step of storing the data to the communication apparatus detected in the detection step until communication with another device is enabled in the network communication step; and a communication continuation step of transmitting data including a reply for continuing communication with another device, based on the data to the communication apparatus detected in the detection step, until communication with another device is enabled in the network communication step. After being driven, if data is stored in the data storage step, the network communication step includes a step of communicating with another device based on the stored data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing an overview of an information processing system in accordance with an embodiment of the present invention.

FIG. 5 shows an example of a request sent by PC to MFP.

FIG. 6 shows an example of a communication continuation reply sent to PC by the communication I/F portion executing a communication continuation program.

FIG. 7 shows an example of a final reply sent to PC by the communication I/F portion executing a communication continuation program.

FIG. 9 is a flowchart showing an exemplary flow of a network communication process.

DESCRIPTION OF THE PREFERRED EMBODIMENTS

Figure 2:
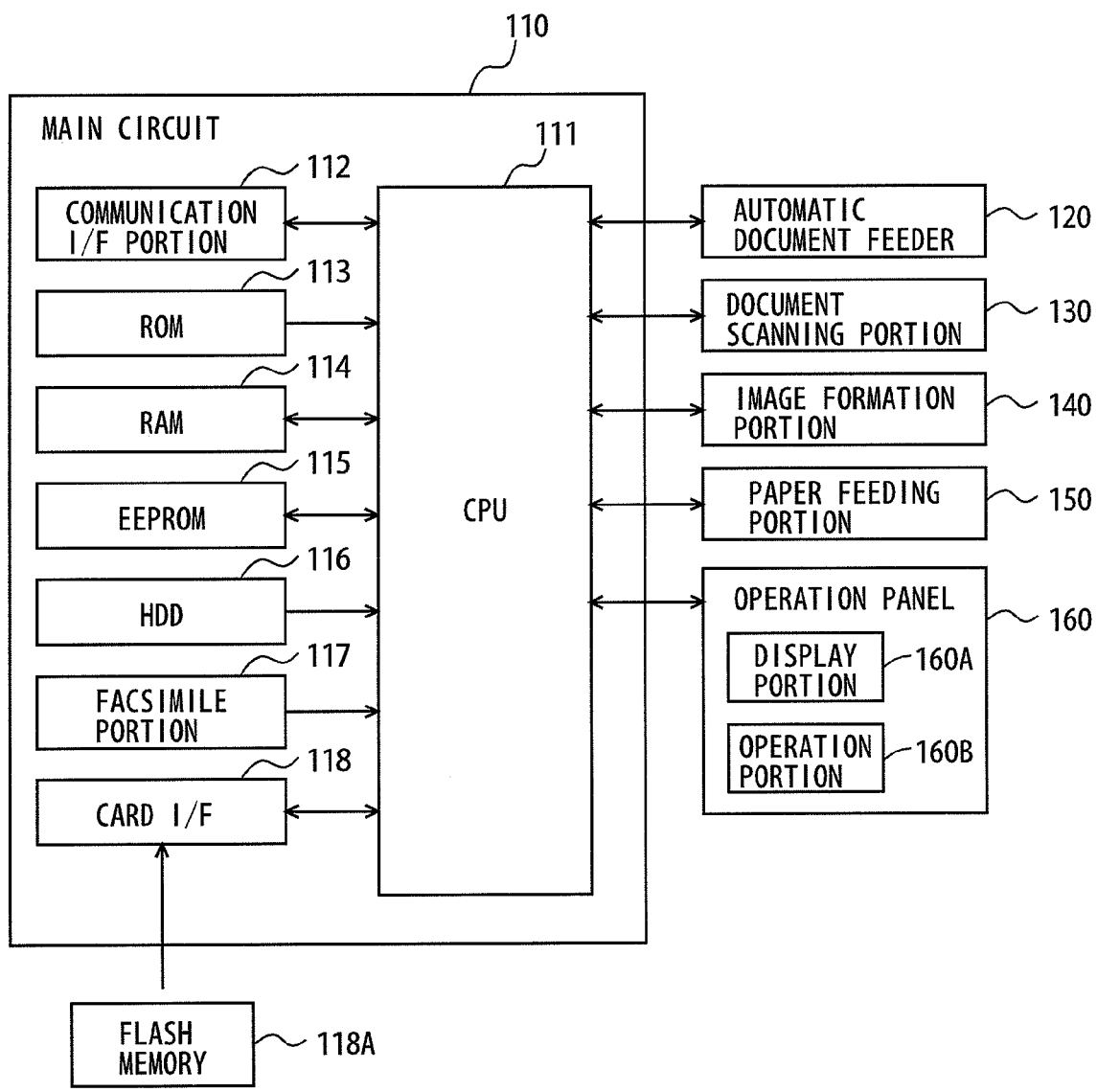
FIG. 2 is a block diagram showing an overview of functions of MFP.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 is a diagram showing an overview of an information processing system in an embodiment of the present invention. Referring to FIG. 1, an information processing system 1 includes an MFP 100, and personal computers (hereinafter referred to as "PC") 105, 105A, 105B, each being connected to a network 2.

Network 2 is a local area network (LAN) and the form of connection can be wired or wireless. Network 2 is not limited to a LAN and may be, for example, a network using a Public Switched Telephone Network. Network 2 may be the Internet or a wide area network (WAN).

MFP 100 includes a scanner for scanning documents, an image forming apparatus for forming an image on a recording medium such as paper based on image data, and has an image scanning function, a copy function, and a facsimile transmission/reception function. MFP 100 also functions as a Web server so that MFP 100 can be remotely operated by other devices. Specifically, MFP 100 stores Web pages written in a markup language such as HTML (HyperText Markup Language) or XML (Extensible Markup Language) and sends a Web page in response to a request from PC 105, 105A, 105B serving as clients. The Web page stored in MFP 100 is an operation screen for operating MFP 100. A remote operation is accepted when a setting or command input by the user to the operation screen is received.

PC 105, 105A, 105B are general computers, and their hardware configuration and functions are well known. Therefore, a detailed description thereof will not be repeated here. A browsing program for downloading and displaying a Web page stored in a Web server is installed in each of PC 105, 105A, 105B.

The users of PC 105, 105A, 105B allow PC 105, 105A, 105B to execute the browsing program, and input URL allocated beforehand to MFP 100 functioning as a Web server to view the operation screen received from MFP 100. The users input a setting or command in accordance with the operation screen, so that PC 105, 105A, 105B executing the browsing program sends the setting or command to MFP 100. Thus, MFP 100 can be remotely operated.

In the present embodiment, MFP 100 is described as an example of an image processing apparatus including a communication apparatus. However, MFP 100 may be, for example, a printer, a facsimile machine, or a computer as long as it includes a communication apparatus capable of connecting to network 2.

FIG. 2 is a block diagram showing an overview of functions of MFP. Referring to FIG. 2, MFP 100 includes a main circuit 110, a document scanning portion 130 for scanning a document, an automatic document feeder 120 for transferring a document to document scanning portion 130, an image formation portion 140 for forming on paper and the like a still image output by document scanning portion 130 scanning a document, a paper-feeding portion 150 for supplying paper to image formation portion 140, and an operation panel 160 as a user interface.

Main circuit 110 includes a CPU 111, a communication interface (I/F) portion 112, a ROM (Read Only Memory) 113, a RAM (Random Access Memory) 114, an EEPROM (Electronically Erasable and Programmable ROM) 115, a hard disk drive (HDD) 116 as a mass storage device, a facsimile portion 117, and a card interface (I/F) 118 to which a flash memory 118A is attached. CPU 111 is connected to automatic document feeder 120, document scanning portion 130, image formation portion 140, paper-feeding portion 150, and operation panel 160 to control MFP 100 as a whole.

ROM 113 stores a program executed by CPU 111 or data necessary to execute the program. RAM 114 is used as a work area when CPU 111 executes a program. RAM 114 also temporarily stores scan data (image data) successively sent from document scanning portion 130.

Operation panel 160 is provided on the top face of MFP 100 and includes a display portion 160A and an operation panel 160B. Operation panel 160 is a first user I/F for the user to directly input an operation to MFP 100. Display portion 160A is a display device such as a liquid crystal display (LCD), an organic ELD (Electroluminescence Display) and displays instruction menus for the user, information concerning the obtained image data, and the like. Operation panel 160B includes a plurality of keys and accepts inputs of data such as instructions, characters, and numerals through the user's operations corresponding to the keys. Operation panel 160B further includes a touch-panel provided on display portion 160A.

Communication I/F portion 112, which is an exemplary communication apparatus, connects MFP 100 to network 2. CPU 111 communicates with PC 105, 105A, 105B through communication I/F portion 112 to transmit/receive data. Communication I/F portion 112 can also communicate with a computer connected to the Internet via network 2.

Facsimile portion 117 is connected to Public Switched Telephone Network (PSTN) to transmit facsimile data to PSTN or receive facsimile data from PSTN. Facsimile portion 117 stores the received facsimile data into HDD 116 or outputs the same to image formation portion 140. Image formation portion 140 prints the facsimile data received by facsimile portion 117 on paper. In addition, facsimile portion 117 converts the data stored in HDD 116 into facsimile data and transmits the converted data to a facsimile machine connected to PSTN.

Flash memory 118A is attached to card I/F 118. CPU 111 can access flash memory 118A through card I/F 118. CPU 111 loads a program recorded on flash memory 118A attached to card I/F 118, into RAM 114 for execution. It is noted that the program executed by CPU 111 is not limited to a program recorded in flash memory 118A. A program stored in HDD 116 may be loaded into RAM 114 for execution. In this case, another computer connected to network 2 may overwrite the program stored in HDD 116 of MFP 100 or may additionally write a new program. Furthermore, MFP 100 may download a program from another computer connected to network 2 and store the program into HDD 116. The program referred to herein includes not only a program directly executable by CPU 111 but also a source program, a compressed program, an encrypted program, and the like.

MFP 100 switches the operation mode between a normal mode and a power saving mode in which power consumption is smaller than in the normal mode. Specifically, when no external request is input over a predetermined duration of time, CPU 111 switches the operation mode to the power saving mode. The operation mode is switched to the normal mode in response to an external request when the power saving mode is being switched on. The external request is, for example, reception of data sent to MFP 100 by communication I/F portion 112, reception of an incoming call by facsimile portion 117, and acceptance of an operation by operation panel 160.

When the operation mode is switched to the power saving mode, CPU 111 outputs an instruction to switch the operation mode to the power saving mode to communication I/F portion 112, document scanning portion 130, image formation portion 140, and facsimile portion 117. Upon receiving the instruction to switch the operation mode to the power saving mode, communication I/F portion 112, document scanning portion 130, image formation portion 140, and facsimile portion 117 switch the operation mode from the normal mode to the power saving mode and operate in the power saving mode in which only predetermined functions are enabled, or stop all the functions, thereby reducing power consumption. The operation mode of communication I/F portion 112 will be described in detail below.

Figure 3:
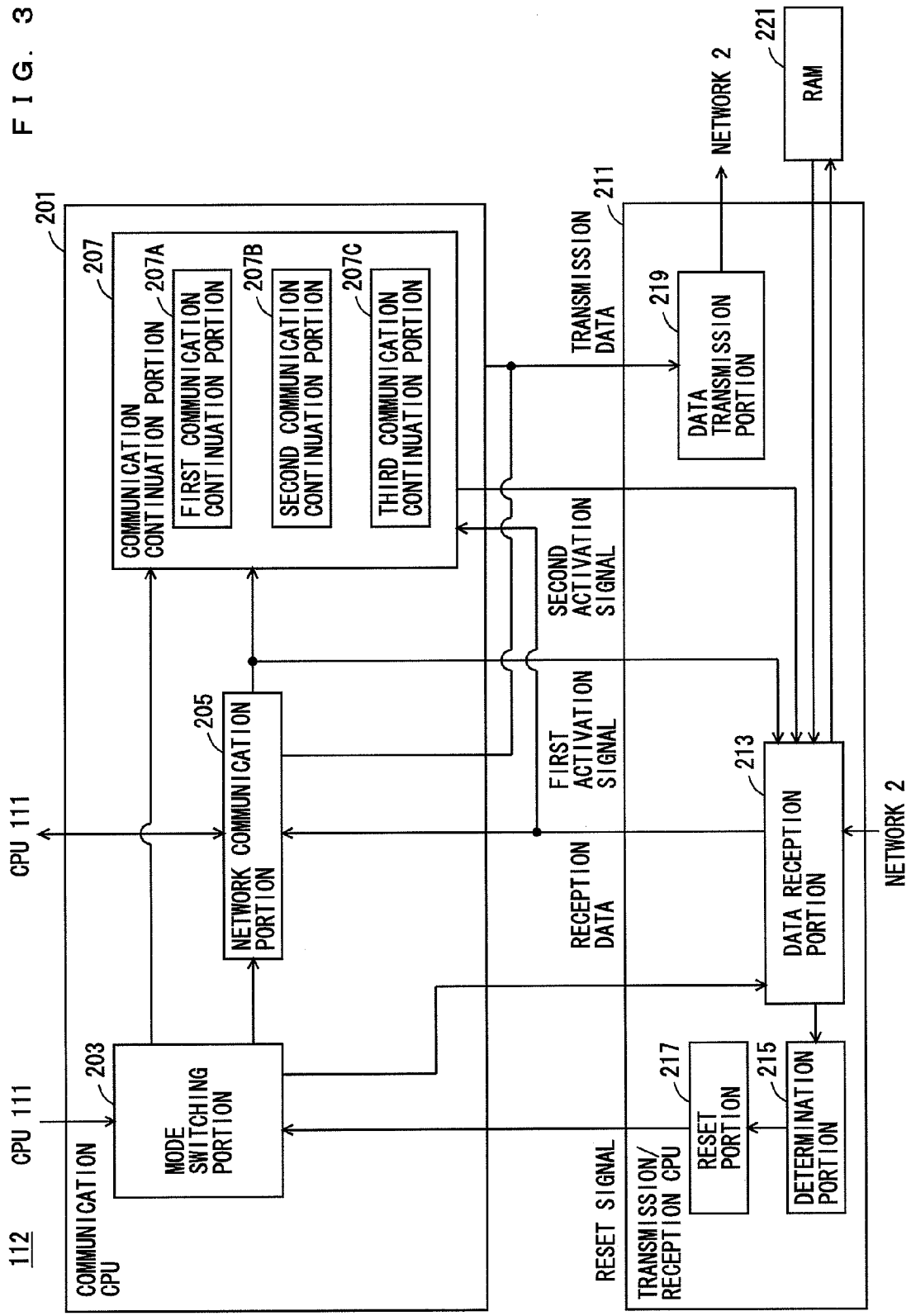
FIG. 3 is a block diagram showing specific functions of a communication I/F portion.

FIG. 3 is a block diagram showing specific functions of the communication I/F portion. Referring to FIG. 3, communication I/F portion 112 includes a transmission/reception CPU 211 physically connected to network 2, a communication CPU 201 logically connected to network 2 through transmission/reception CPU 211, and a RAM 221. Transmission/reception CPU 211 and communication CPU 201 each communicate with PC 105, 105A, 105B connected to network 2 by executing a program to execute prescribed processes. The processes executed by transmission/reception CPU 211 and communication CPU 201 are predetermined. Here, transmission/reception CPU 211 executes the processes in the first layer (Physical Layer), the second layer (Data Link Layer), and the third layer (Network Layer) in OSI (Open Systems Interconnection) reference model, and communication CPU 201 executes the processes in the layers higher than the fourth layer (Transport Layer). It is noted that communication CPU 201 may execute all the processes in the fourth layer, the fifth layer (Session Layer), the sixth layer (Presentation Layer), and the seventh layer (Application Layer) or may execute the process in one of them, where CPU 111 may execute the processes in the higher layers.

Thus, communication CPU 201 communicates with PC 105, 105A, 105B connected to network 2 through transmission/reception CPU 211. Communication CPU 201 is driven and consumes power when the operation mode is the normal mode. However, communication CPU 201 is not driven and does not consume power in the power saving mode and. On the other hand, transmission/reception CPU 211 is driven and consumes power when the operation mode is either the normal mode or the power saving mode.

Figure 4:
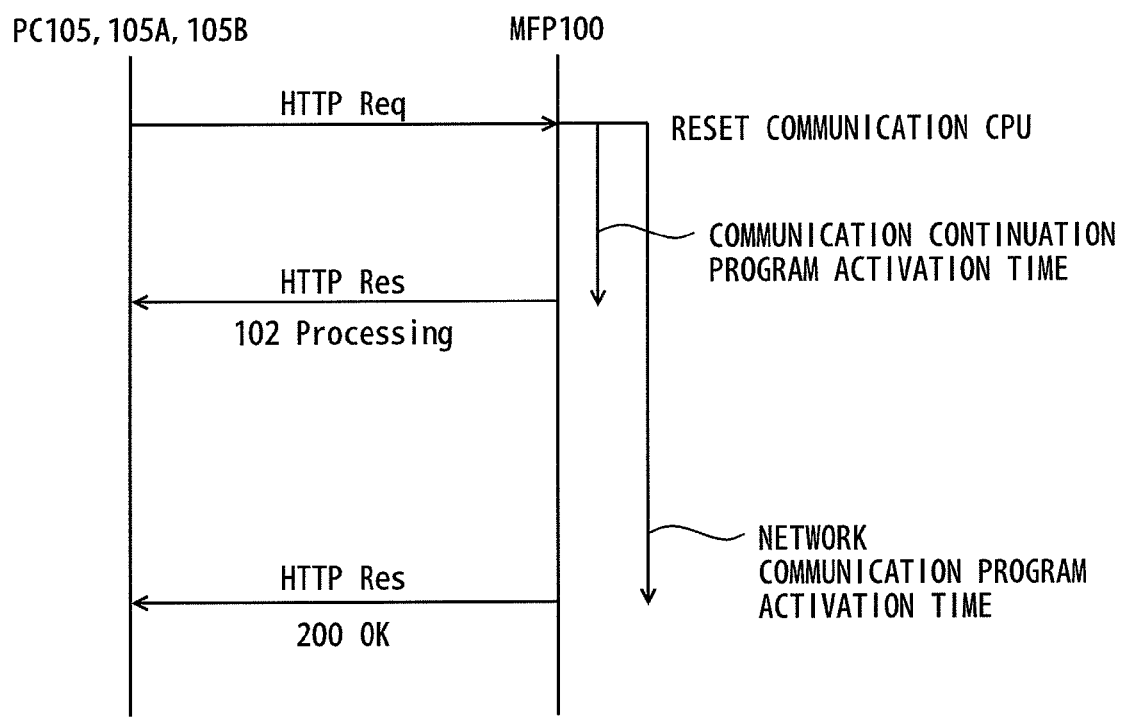
FIG. 4 is a diagram illustrating an operation of the communication I/F portion in a power saving mode.

FIG. 4 is a diagram illustrating an operation of the communication I/F portion in the power saving mode. Referring to FIG. 3 and FIG. 4, here, communication I/F portion 112 receives a request (HTTP Req) from PC 105. When communication I/F portion 112 receives a request (HTTP Req) from PC 105, transmission/reception CPU 211 receives the request and temporarily stores the received request in RAM 221, and releases the reset of communication CPU 201. When the reset is released, CPU 201 activates a communication continuation program and a network communication program. The activation here includes the process in which communication CPU 201 loads the communication continuation program and the network communication program from a not-shown ROM into RAM and executes the loaded communication continuation program and network communication program. Therefore, a prescribed time is required for communication CPU 201 to be able to execute the communication continuation program and the network communication program after starting the loading of these programs.

Here, the communication continuation program includes the step for executing a part of the process of the network communication program. The activation time taken for communication CPU 201 to be able to execute the communication continuation program after starting loading is shorter than that for the network communication program. Therefore, when communication CPU 201 starts loading the communication continuation program and the network communication program at the same time, communication CPU 201 becomes ready to execute the communication continuation program ahead of the network communication program.

When ready to execute the communication continuation program, communication CPU 201 reads out the request temporarily stored in RAM 221 and sends to PC 105 a communication continuation reply (102 Processing) for continuing communication with PC 105 that has sent the request. This communication continuation reply is a reply to the request sent from PC 105 and indicates that the request is being processed. Accordingly, PC 105 determines that the request has been received by MFP 100 and continues communication in a standby state until a final reply to the request is received.

After executing the communication continuation program and sending the communication continuation reply, when the network communication program becomes executable, communication CPU 201 reads out the request temporarily stored in RAM 221, executes the process for the reply, and sends a final reply (200 OK) indicating that the process has been completed, to PC 105 that has sent the request. PC 105, receiving the final request, determines that the requested process has been executed by MFP 100.

FIG. 5 shows an example of the reply sent by PC to MFP. FIG. 6 shows an example of the communication continuation reply sent to PC by the communication I/F portion executing the communication continuation program. FIG. 7 shows an example of the final reply sent to PC by the communication I/F portion executing the network communication program.

Returning to FIG. 3, transmission/reception CPU 211 includes a data reception portion 213, a determination portion 215 determining a communication protocol of the received data, a reset portion 217 releasing the reset of communication CPU 201, and a data transmission portion 219. Data reception portion 213 receives data to MFP 100 from network 2. Specifically, data reception portion 213 monitors data flow over network 2, and when detecting data (packet) to MFP 100, outputs the detected data to MFP 100 to determination portion 215. Whether data is directed to MFP 100 or not is determined by MAC (Media Access Control) address set in the header of the packet. The packet including MAC address allocated to communication I/F portion 112 is determined as data to MFP 100.

Data reception portion 213 receives, from a mode switching portion 203 described later, a stop signal indicating the operation mode is switched to the power saving mode, receives from network communication portion 205 a first activation signal indicating that it becomes ready to be driven, and receives from a communication continuation portion 207 a second activation signal indicating that it becomes ready to be driven. When detecting data to MFP 100 after receiving the stop signal from mode switching portion 203, data reception portion 213 stores the detected data into RAM 221 and also outputs the same to determination portion 215.

Determination portion 215 receives the data from data reception portion 213 and determines the communication protocol of the data. The communication protocol is a protocol for communication of a network communication portion 205 described later and is determined depending on the received data. For example, determination portion 215 determines the communication protocol by referring to the communication protocol defined in the header of the data. Determination portion 215 outputs the determined communication protocol to reset portion 217.

Reset portion 217 outputs to communication CPU 201 a reset signal predetermined for the communication protocol input from determination portion 215. A plurality of reset signals are prepared corresponding to a plurality of communication protocols. The reset signal output by reset portion 217 specifies one of a plurality of communication protocols.

Communication CPU 201 includes mode switching portion 203 switching the operation mode, network communication portion 205, and communication continuation portion 207. Mode switching portion 203 switches the operation mode of communication CPU 201 between the normal mode and the power saving mode in which power consumption is smaller than in the normal mode. Specifically, if an instruction to switch the operation mode to the power saving mode is input from CPU 111 when the normal mode is switched on, mode switching portion 203 switches the operation mode to the power saving mode. If a reset signal is input from transmission/reception CPU 211, mode switching portion 203 switches the operation mode to the normal mode. Here, mode switching portion 203 cuts off power supplied to communication CPU 201 and stops the driving of communication CPU 201 in the power saving mode, and activates communication CPU 201 in the normal mode. When the operation mode is switched from the power saving mode to the normal mode, communication CPU 201 outputs an activation instruction to network communication portion 205 and communication continuation portion 207. The activation instruction output to communication continuation portion 207 includes the communication protocol specified by the reset signal.

Network communication portion 205 is a task formed in communication CPU 201 by the execution of the network communication program by communication CPU 201. Communication continuation portion 207 is a task formed in communication CPU 201 by the execution of the communication continuation program by communication CPU 201. Therefore, the activation instruction output by mode switching portion 203 to network communication portion 205 is equivalent to the start of the process of communication CPU 201 loading the network communication program from ROM to RAM. The activation instruction output to communication continuation portion 207 is equivalent to the start of the process of communication CPU 201 loading the communication continuation program from ROM to RAM.

Since part of the process of the network communication program is written in the communication continuation program, the time taken to load the communication continuation program from ROM to RAM is shorter than the time taken to load the network communication program. Therefore, communication continuation portion 207 becomes ready to execute the process (ready to be driven) earlier than network communication portion 205. When the communication continuation program becomes executable, the second activation signal is output to data reception portion 213. When network communication portion 205 becomes executable, the first activation signal is output to data reception portion 213 and communication continuation portion 207.

Data reception portion 213 included in transmission/reception CPU 211 determines whether network communication portion 205 is in a state in which it is ready to be driven, from the stop signal input from mode switching portion 203 and the first activation signal input from network communication portion 205. It is determined that network communication portion 205 is in a state in which it is ready to be driven, after the first activation signal is input from network communication portion 205 until the stop signal is input from mode switching portion 203. It is determined that network communication portion 205 is in a state in which it is not ready to be driven, after the stop signal is input from mode switching portion 203 until the first activation signal is input from network communication portion 205.

Data reception portion 213 also determines whether communication continuation portion 207 is in a state in which it is ready to be driven, from the second activation signal input from communication continuation portion 207 and the first activation signal input from network communication portion 205. It is determined that communication continuation portion 207 is in a state in which it is ready to be driven, after the second activation signal is input from communication continuation portion 207 until the first activation signal is input from network communication portion 205. It is determined that communication continuation portion 207 is in a state in which it is not ready to be driven, after the first activation signal is input from network communication portion 205 until the second activation signal is input from communication continuation portion 207. This is because communication continuation portion 207 stops when the first activation signal is input from network communication portion 205, as described later.

If network communication portion 205 is in a state in which it is ready to be driven, data reception portion 213 outputs the detected data to MFP 100 to network communication portion 205. If network communication portion 205 is not in a state in which it is ready to be driven, data reception portion 213 stores the detected data to MFP 100 into RAM 221. When network communication portion 205 changes from a state in which it is not ready to be driven to a state in which it is ready to be driven, if data is stored in RAM 221, data reception portion 213 outputs the stored data to network communication portion 205 and erases the output data from RAM 221. If communication continuation portion 207 is in a state in which it is ready to be driven, data reception portion 213 outputs the detected data to MFP 100 to communication continuation portion 207. When communication continuation portion 207 changes from a state in which it is not ready to be driven to a state in which it is ready to be driven, if data is stored in RAM 221, data reception portion 213 outputs the stored data to communication continuation portion 207.

In other words, data reception portion 213 stores the detected data to MFP 100 into RAM 221 after the stop signal is input from mode switching portion 203 until the first activation signal is input from network communication portion 205. When the stop signal is input from mode switching portion 203 and the second activation signal is thereafter input from communication continuation portion 207, if data is stored in RAM 221, data reception portion 213 outputs the stored data to communication continuation portion 207. Furthermore, data reception portion 213 outputs the detected data to communication continuation portion 207 after the second activation signal is input from communication continuation portion 207 until the first activation signal is input from network communication portion 205. Furthermore, when the first activation signal is input from network communication portion 205, if data is stored in RAM 221, data reception portion 213 outputs the stored data to communication continuation portion 207 and outputs the detected data to network communication portion 205 until the stop signal is input from mode switching portion 203.

On the other hand, communication continuation portion 207 included in communication CPU 201 includes first to third communication continuation portions 207A, 207B, 207C. The communication protocols corresponding to first to third communication continuation portions 207A, 207B, 207C are different from each other. When communication continuation portion 207 receives the activation instruction from mode switching portion 203, one of first to third communication continuation portions 207A, 207B, 207C that corresponds to the communication protocol included in the activation instruction is activated. Specifically, first communication continuation portion 207A is a task formed in communication CPU 201 by the execution of the first communication continuation program corresponding to the first communication protocol by communication CPU 201. Second communication continuation portion 207B is a task formed in communication CPU 201 by the execution of the second communication continuation program corresponding to the second communication protocol by communication CPU 201. Third communication continuation portion 207C is a task formed in communication CPU 201 by the execution of the third communication continuation program corresponding to the third communication protocol by communication CPU 201.

Here, communication CPU 201 executes the three, first to third communication continuation programs, by way of example. However, the number of communication continuation programs executable by communication CPU 201 is not limited to three as long as it is one or more. The communication continuation programs executable by communication CPU 201 are determined by the predetermined number of communication protocols.

When the activation instruction is input from mode switching portion 203, at least one of first to third communication continuation portions 207A, 207B, 207C included in communication continuation portion 207 is activated. First to third communication continuation portion 207A, 207B, 207C are different only in the communication programs corresponding to them, and therefore, the activation of first communication continuation portion 207A will be described here by way of example. First communication continuation portion 207A outputs the second activation signal to data reception portion 213, when being activated by mode switching portion 203 to become ready to be driven. Specifically, when communication CPU 201 loads the first communication continuation program from ROM to RAM to allow the first communication continuation program to be executable, the second activation signal is output to data reception portion 213.

Data reception portion 213 receiving the second activation signal outputs the data stored in RAM 221, if any, or the data to MFP 100 from network 2, if detected, to communication continuation portion 207. When data is input from data reception portion 213, first communication continuation portion 207A outputs a communication continuation reply to data transmission portion 219 to respond to the data.

Network communication portion 205 included in communication CPU 201 outputs the first activation signal to data reception portion 213 and first communication continuation portion 207A, when being activated by mode switching portion 203 to become ready to be driven. Specifically, when communication CPU 201 loads the network communication program from ROM to RAM to allow the network communication program to be executable, the first activation signal is output to data reception portion 213 and communication continuation portion 207. Here, first communication continuation portion 207A is ready to be driven, and therefore, the first activation signal is input to first communication continuation portion 207A. First communication continuation portion 207A receiving the first activation signal stops being driven. Specifically, communication CPU 201 terminates the execution of the first communication continuation program.

Data reception portion 213 receiving the first activation signal outputs the data stored in RAM 221, if any, and the data to MFP 100 from network 2, if detected, to network communication portion 205. When data is input from data reception portion 213, network communication portion 205 responds to the data and outputs a final reply to data transmission portion 219. Network communication portion 205 outputs the data input from data reception portion 213 to CPU 111, if necessary.

CPU 111 processes the data input from data reception portion 213 and outputs the processed data to network communication portion 205. For example, if the process of transmitting a Web page is executed in CPU 111, the data input to network communication portion 205 includes, for example, a command that requests the transmission of a Web page, such as Get command. In this case, network communication portion 205 outputs Get command to CPU 111. In response to input of Get command, CPU 111 outputs the Web page specified by URL included in Get command to network communication portion 205. Network communication portion 205 outputs a final reply including the Web page input from CPU 111 to data transmission portion 219. If the data input to network communication portion 205 is print data for printing, network communication portion 205 outputs the print data to CPU 111 and outputs a final reply including a signal indicating that the print data has been received, to data transmission portion 219. CPU 111 receiving the print data allows image formation portion 140 to form an image based on the print data.

When the communication continuation reply is input from communication continuation portion 207, data transmission portion 219 included in transmission/reception CPU 211 sends the communication continuation reply to network 2. When the final reply is input from network communication portion 205, data transmission portion 219 sends the final reply to network 2.

Figure 8:
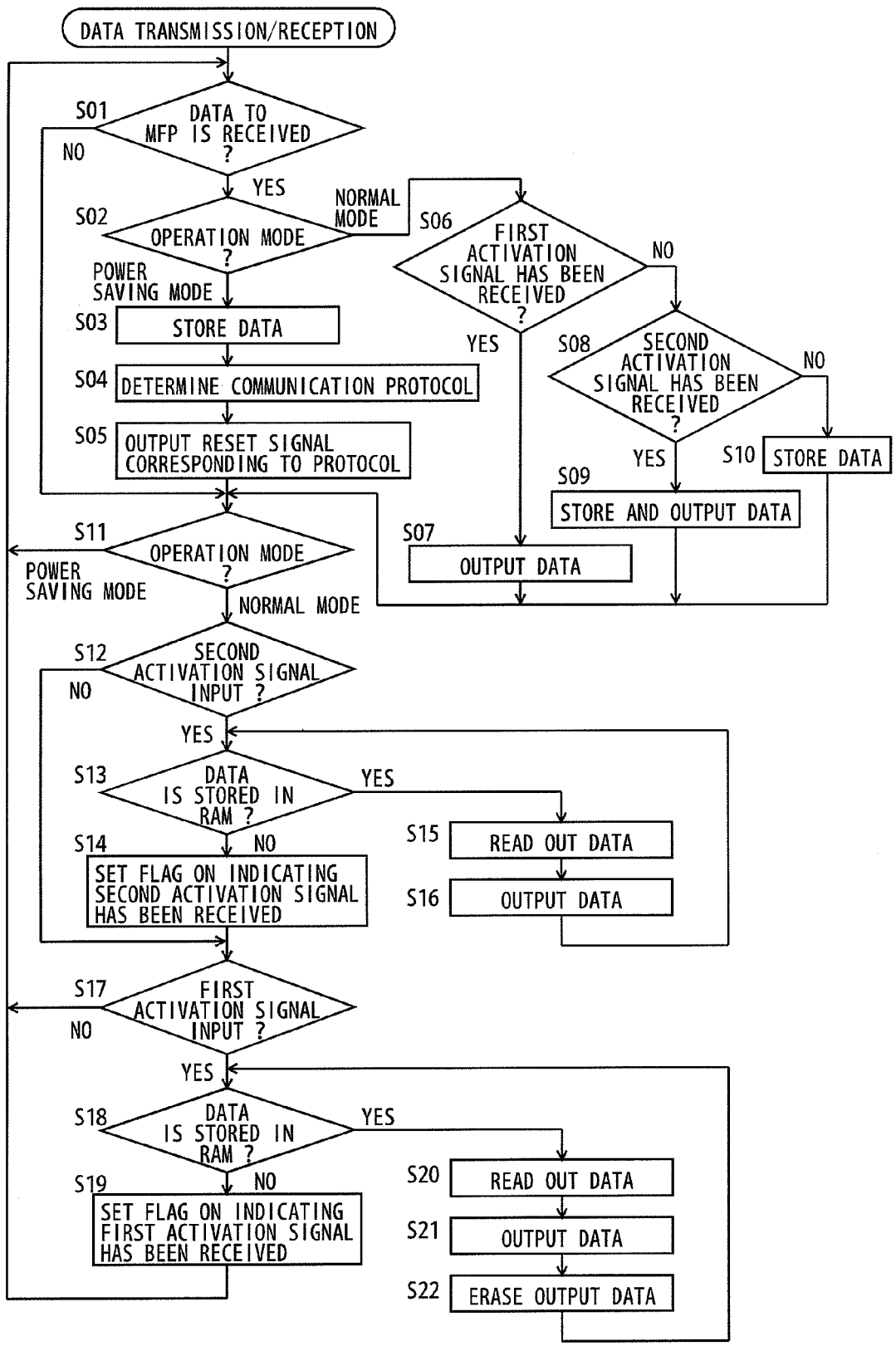
FIG. 8 is a flowchart showing an exemplary flow of a data transmission/reception process.

FIG. 8 is a flowchart showing an exemplary flow of a data transmission/reception process. The data transmission/reception process is a process executed by transmission/reception CPU 211 executing a data transmission/reception program. Referring to FIG. 8, transmission/reception CPU 211 determines whether data to MFP 100 is received or not (step S01). Specifically, transmission/reception CPU 211 monitors data flow over network 2, detects a packet in which MAC address allocated to MFP 100 is set in its header, and obtains the detected packet as data to MFP 100. If data to MFP 100 is received (YES in step S01), the process proceeds to step S02. If not (NO in step S01), the process proceeds to step S11.

In step S02, the operation mode of communication CPU 201 is determined. It is determined that the operation mode is the normal mode, after the reset signal is sent to communication CPU 201 in step S05 described later. It is determined that the operation mode is the power saving mode, after the stop signal is input from communication CPU 201. If the operation mode of communication CPU 201 is the power saving mode, the process proceeds to step S03. If the normal mode, the process proceeds to step S06.

In step S03, the data received in step S01 is stored into RAM 221, and the process then proceeds to step S04. In step S04, the communication protocol is determined based on the data received in step S01. Then, in the next step S05, the reset signal corresponding to the determined communication protocol is output to communication CPU 201, and the process then proceeds to step S11.

When the process proceeds to step S06, the operation mode of communication CPU 201 is the normal mode. If the operation mode of communication CPU 201 is the normal mode, the network communication program and the communication continuation program are loaded from ROM to RAM for execution, where the communication continuation program becomes executable earlier, and the network communication program becomes executable after that. Communication CPU 201 outputs the second activation signal when the communication continuation program becomes executable, and outputs the first activation signal when the network communication program becomes executable. The first activation signal is received in step S17 described later, and the second activation signal is received in step S12 described later.

In step S06, it is determined that the first activation signal has been received or not. If the first activation signal has been received, the process proceeds to step S07. If not, the process proceeds to step S08. In step S07, the data received in step S01 is output to communication CPU 201, and the process then proceeds to step S11. When the process proceeds from step S06 to step S07, the network communication program is in an executable state in communication CPU 201, and therefore, the data output to communication CPU 201 is processed by communication CPU 201 executing the network communication program.

In step S08, it is determined whether the second activation signal has been received or not. If the second activation signal has been received, the process proceeds to step S09. If not, the process proceeds to step S10. In step S09, the data received in step S01 is stored into RAM 221 and is also output to communication CPU 201, and the process then proceeds to step S11. When the process proceeds to step S09, the network communication program cannot be executed but the communication continuation program is executable in communication CPU 201. Therefore, data is stored into RAM 221 in order that communication CPU 201 executing the network communication program can process the data after the network communication program becomes executable in communication CPU 201. Data is output to communication CPU 201 in order that communication CPU 201 executing the communication continuation program can process the data.

In step S10, the data received in step S01 is stored into RAM 221, and the process then proceeds to step S11. When the process proceeds to step S12, the network communication program and the communication continuation program cannot be executed in communication CPU 201. Therefore, the data is processed by communication CPU 201 executing the communication continuation program or the network communication program, after the communication continuation program or the network communication program becomes executable in communication CPU 201.

In step S11, similar to step S02, the operation mode of communication CPU 201 is determined. If the operation mode of communication CPU 201 is the power saving mode, the process returns to step 01. If it is the normal mode, the process proceeds to step S12. In step S12, it is determined whether the second activation signal is input from communication CPU 201. If the second activation signal is input, the process proceeds to step S13. If not, the process proceeds to step S17. In step S13, it is determined whether data is stored in RAM 221. If data is stored in RAM 221, the process proceeds to step S15. If not, the process proceeds to step S14. In step S14, a flag indicating that the second activation signal has been received is set ON, and the process then proceeds to step S17.

On the other hand, in step S15, data is read out from RAM 221. Then, the read data is output to communication CPU 201 (step S16), and the process then returns to step S13. If a plurality of data is stored in RAM 221, all of the plurality of data is output to communication CPU 201. In this case, as communication CPU 201 cannot execute the network communication program and can execute the communication continuation program, the data is processed by communication CPU 201 executing the communication continuation program.

In step S17, it is determined whether the first activation signal is input from communication CPU 201. If the first activation signal is input, the process proceeds to step S18, and if not, the process returns to step S01. In step S18, it is determined whether data is stored in RAM 221. If data is stored in RAM 221, the process proceeds to step S20. If not, the process proceeds to step S19. In step S19, a flag indicating that the first activation signal has been received is set ON, and the process then returns to step S01.

On the other hand, in step S20, data is read out from RAM 221. Then, the read data is output to communication CPU 201 (step S21). In the next step S22, the output data is erased from RAM 221, and the process then returns to step S18. In this manner, when a plurality of data is stored in RAM 221, all of the plurality of data is output to communication CPU 201 and erased from RAM 221. When data is output to communication CPU 201, communication CPU 201 is executing the network communication program, and therefore, the data is processed by communication CPU 201 executing the network communication program. Since data output to communication CPU 201 is erased from RAM 221, the same data is not processed redundantly by communication CPU 201 executing the network communication program.

FIG. 9 is a flowchart showing an exemplary flow of a network communication process. The network communication process is a process executed by communication CPU 201 executing the network communication program. Referring to FIG. 9, communication CPU 201 outputs the first activation signal (step S31). At the stage when the first activation signal is output, transmission/reception CPU 211 can execute the data transmission/reception program, and communication CPU 201 is executing one of the first to third communication programs. Therefore, the first activation signal is output to transmission/reception CPU 211 and is also output to the task formed by communication CPU 201 executing one of the first to third communication programs.

In the next step S32, it is determined whether data is input from transmission/reception CPU 211. If data is input, the process proceeds to step S33. If not, the process proceeds to step S35. The input data is a request to MFP 100.

In step S33, a prescribed process is executed for the input data. The prescribed process is a process predetermined for the data. In the next step S34, transmission data, which depends on the data processing executed in step S33, is output to transmission/reception CPU 211, and the process then proceeds to step S35. The transmission data is the final reply corresponding to the input data. For example, if the input data is print data for printing, print data is output to CPU 111 in step S33, and the final reply including a signal indicating that the print data has been received is output as transmission data to transmission/reception CPU 211 in step S34. If the input data includes Get command that requests the transmission of a Web page, Get command is output to CPU 111 in step S33, and the process waits until the Web page specified by URL included in Get command is input from CPU 111. Then, when the Web page is input, the final reply including the Web page is output as transmission data to transmission/reception CPU 211 in step S34.

In step S35, it is determined whether the operation mode is switched to the power saving mode. If the operation mode is switched to the power saving mode, the process ends. If not, the process returns to step S32.

Figure 10:
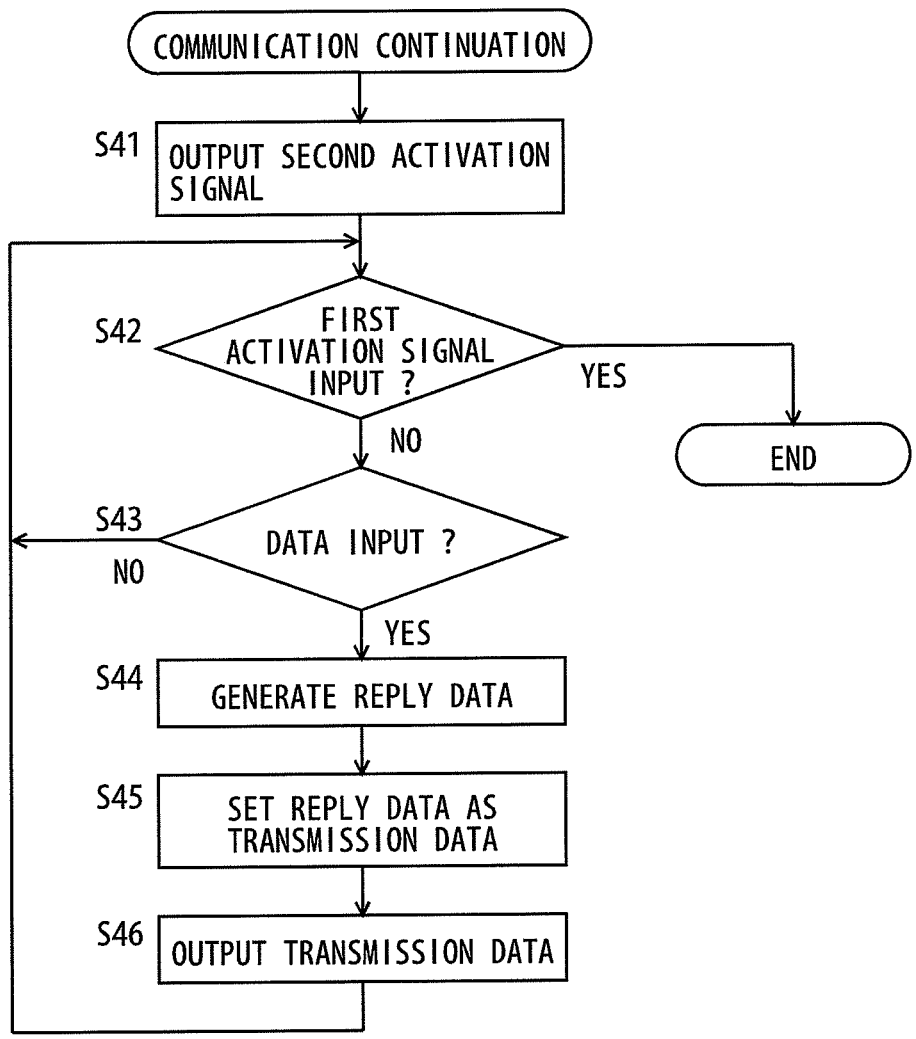
FIG. 10 is a flowchart showing an exemplary flow of a communication continuation process.

FIG. 10 is a flowchart showing an exemplary flow of a communication continuation process. The communication continuation process is executed by communication CPU 201 executing one of the first to third communication programs. Here, a description will be made to the process executed by communication CPU 201 when communication CPU 201 executes the first communication program, by way of example.

Referring to FIG. 10, communication CPU 201 outputs the second activation signal to transmission/reception CPU 211 (step S41). In the next step S42, it is determined whether the first activation signal is input from the task executing the network communication program. If the first activation signal is input, the process ends. If not, the process proceeds to step S43. This is because the communication continuation process is a process executed after communication CPU 201 is activated until the network communication program becomes executable.

In step S43, it is determined whether data is input from transmission/reception CPU 211. If data is input, the process proceeds to step S44. If not, the process returns to step S42. In step S44, reply data is generated to respond to the input data, and the process then proceeds to step S45. The reply data is the communication continuation reply for continuing the communication in response to the request, for example, the communication continuation reply shown in FIG. 5.

In step S45, the generated reply data is set as transmission data, and in the next step S46, the transmission data is output to transmission/reception CPU 211.

As described above, MFP 100 in the present embodiment can switch the operation mode between the normal mode and the power saving mode. Communication I/F portion 112 switches the operation mode from the normal mode to the power saving mode in response to the switching of the operation mode of MFP 100 to the power saving mode. Communication I/F portion 112 includes transmission/reception CPU 211 communicating with another device connected to the network and communication CPU 201 being driven in response to input of the reset signal from transmission/reception CPU 211 to communicate with another device through transmission/reception CPU 211. Transmission/reception CPU 211 includes data reception portion 213 detecting data transmitted to MFP 100 from another device connected to the network, RAM 221 storing the detected data to MFP 100, and reset portion 217 outputting the reset signal to communication CPU 201 in response to detection of the data to MFP 100.

Communication CPU 201 includes mode switching portion 203 stopping the driving of communication CPU 201, for example, in response to MFP 100 switching to the power saving mode, network communication portion 205 communicating with another device based on the data to MFP 100, and communication continuation portion 207 transmitting data including a reply for continuing communication with another device, based on the data to MFP 100, until network communication portion 205 becomes able to communicate with another device.

If transmission/reception CPU 211 receives data while communication CPU 201 is not driven, the data is stored into RAM 221 and communication CPU 201 is reset and driven. When being reset, communication CPU 201 loads the network communication program from ROM into RAM and executes the program. Thus, network communication portion 205 is formed in communication CPU 201. Furthermore, when being reset, communication CPU 201 loads one of the first to third communication continuation programs from ROM into RAM and executes the program. Thus, one of first to third communication continuation programs 207A, 207B, 207C is formed in communication CPU 201. When network communication portion 205 is formed in communication CPU 201, network communication portion 205 becomes able to communicate with another device, and then, if data is stored in RAM 221, communicates with another device based on the stored data. Therefore, communication CPU 201 can reduce power consumption while it is not being driven in the power saving mode.

Until communication CPU 201 executes the network communication program to form a task and becomes able to communicate with another device, the task formed by communication CPU 201 executing one of the first to third communication continuation programs transmits data including the reply for continuing communication with another device, based on the data to MFP 100. Therefore, the communication can be continued with another device that has sent the received data, until communication CPU 201 executes the network communication program to form a task and becomes able to communicate with another device.

After communication CPU 201 executes the network communication program to form a task and becomes able to communicate with another device, if data received before then is stored, communication CPU 201 communicates with another device based on the stored data. Therefore, the communication with another device can be continued with reduced power consumption.

Transmission/reception CPU 211 is driven even when communication CPU 201 is not driven, and includes determination portion 215 determining a communication protocol based on data to MFP 100. Reset portion 217 outputs to communication CPU 201 a reset signal for executing only the one of the first to third communication continuation programs that corresponds to the communication protocol determined based on the data to MFP 100. Therefore, communication CPU 201 has to load only the one of the first to third communication continuation programs that corresponds to the communication protocol determined based on the data to MFP 100, so that the load of activation of communication CPU 201 can be minimized and the time taken to load the network communication program from ROM to RAM can be shortened.

After the one of the first to third communication continuation programs that corresponds to the communication protocol determined based on data to MFP 100 is loaded from ROM to RAM and becomes executable, if data is stored in RAM 221, communication CPU 201 transmits data including the reply for continuing communication with another device, based on the stored data. Therefore, the communication can be continued with another device that has sent data received before communication CPU 201 becomes able to transmit data including the reply for continuing communication.

In the foregoing description, communication CPU 201 executes the first to third communication continuation programs. However, transmission/reception CPU 211, which does not switch the operation mode, may execute the first to third communication continuation programs, and communication continuation portion 207 may be provided in transmission/reception CPU 211.

MFP 100 and communication I/F portion 112 included in MFP 100 have been described above. However, it is needless to say that the present invention can be understood as a communication continuation method for executing the process shown in FIG. 8 and FIG. 9, and a communication continuation program for causing communication CPU 201 and transmission/reception CPU 211 that control communication I/F portion 112 to execute the communication continuation program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication apparatus connected to a network to be able to communicate with another device, comprising:
    a first control portion to communicate with said another device connected to said network; and
    a second control portion to be driven in response to input of a reset signal from said first control portion and to communicate with said another device through said first control portion,
    said first control portion including
        a detection portion to detect data transmitted from said another device connected to said network to the communication apparatus,
        a data storage portion to store the data to the communication apparatus detected by said detection portion, and
        a reset portion to output said reset signal to said second control portion in response to detection of the data to the communication apparatus by said detection portion,
    said second control portion including
        a stop portion to stop driving of said second control portion when a predetermined condition is met, and
        a network communication portion to communicate with said another device based on the data to the communication apparatus detected by said detection portion,
    said second control portion further including a communication continuation portion to transmit data including a reply for continuing communication with said another device, based on the data to the communication apparatus detected by said detection portion, until said network communication portion becomes able to communicate with said another device,
    wherein after becoming able to communicate with said another device, if data is stored in said data storage portion, said network communication portion further communicates with said another device based on the stored data.

2. The communication device according to claim 1, wherein
    said first control portion further includes a determination portion to be driven at least while said second control portion is not being driven, and to determine a communication protocol based on said detected data to the communication apparatus,
    said network communication portion communicates with said another device using one of a plurality of protocols in response to a request from said another device connected to said network,
    a plurality of said communication continuation portions corresponding to said plurality of protocols are provided in said second control portion, and
    when said communication protocol is determined, said reset portion outputs to said second control portion a reset signal for activating only the corresponding communication continuation portion that corresponds to said determined communication protocol, among said plurality of communication continuation portions.

3. The communication apparatus according to claim 1, wherein after becoming able to transmit data, if data is stored in said data storage portion, said communication continuation portion further transmits data including a reply for continuing communication with said another device, based on the stored data.

4. The communication apparatus according to claim 1, wherein said first control portion further includes a data transmission portion that receives data from said communication continuation portion and transmits said data to said another device connected to said network.

5. The communication device according to claim 1, wherein
    said communication continuation portion executes a part of a process executed by said network communication portion, and
    the time taken for said communication continuation portion to be able to execute a process after being driven is shorter than the time taken for said network communication portion to be able to execute a process after being driven.

6. A communication apparatus connected to a network to be able to communicate with another device, comprising:
    a detection portion to detect data transmitted from said another device connected to said network to the communication apparatus;
    a first control portion to communicate with said another device connected to said network;
    a second control portion to be driven in response to input of a reset signal from said first control portion and to communicate with said another device through said first control portion;
    a mode switching portion to switch an operation mode to a power saving mode in which power consumption is smaller than in a normal mode, if a predetermined condition is met while said operation mode is switched to said normal mode, and to switch said operation mode to said normal mode, if said detection portion detects reception of data to the communication apparatus while said operation mode is switched to the power saving mode;
    a network communication portion to stop being driven while said operation mode is switched to said power saving mode, and to be activated when said detection portion detects reception of data to the communication apparatus, and then to communicate with said another device, based on the data detected by said detection portion, after becoming able to communicate with said another device;

a data storage portion to store the data to the communication apparatus detected by said detection portion until said network communication portion becomes able to communicate with said another device; and a communication continuation portion included in said second control portion to transmit data including a reply for continuing communication with said another device, based on the data to the communication apparatus detected by said detection portion, until said network communication portion becomes able to communicate with said another device, wherein after becoming able to communicate with said another device, if data is stored in said data storage portion, said network communication portion further communicates with said another device based on the stored data.

7. The communication apparatus according to claim 6, wherein said communication continuation portion stops being driven if said operation mode is switched to the power saving mode, and is activated when said detection portion detects reception of data to the communication apparatus.

8. The communication apparatus according to claim 7, wherein after becoming able to transmit data, if data is stored in said data storage portion, said communication continuation portion further transmits data including a reply for continuing communication with said another device, based on the stored data.

9. The communication apparatus according to claim 6, further comprising a determination portion to be driven at least while said operation mode is the power saving mode, to determine a communication protocol based on said detected data to the communication apparatus, wherein said network communication portion communicates with said another device using one of a plurality of protocols, in response to a request from said another device connected to said network, a plurality of said communication continuation portions are provided corresponding to said plurality of communication protocols, and when determining said communication protocol, said determination portion activates only the corresponding communication portion that corresponds to said determined communication protocol, among said plurality of communication continuation portions.

10. The communication apparatus according to claim 6, wherein said first control portion operates during said power saving mode and during said normal mode, and said second control portion only operates during said normal mode.

11. The communication device according to claim 6, wherein said communication continuation portion executes a part of a process executed by said network communication portion, and the time taken for said communication continuation portion to be able to execute a process after being driven is shorter than the time taken for said network communication portion to be able to execute a process after being driven.

12. A communication continuation method executed in a communication apparatus connected to a network to be able to communicate with another device, said communication apparatus including a first control portion to communicate with said another device connected to said network, and a second control portion to be driven in response to input of a reset signal from said first control portion and to communicate with said another device through said first control portion, said method allowing said first control portion to execute:

a detection step of detecting data transmitted to the communication apparatus from said another device connected to said network;

a data storage step of storing the data to the communication apparatus detected in said detection step; and a reset step of outputting a reset signal to said second control portion in response to detection of the data to the communication apparatus in said detection step, said method allowing said second control portion to execute:

a step of stopping being driven in response to that a predetermined condition is met; and a network communication step of communicating with said another device based on the data to the communication apparatus detected in said detection step, said method allowing said second control portion to further execute a step of transmitting data including a reply for continuing communication with said another device, based on the data to the communication apparatus detected in said detection step, until communication with said another device is enabled in said network communication step, wherein, after being driven, if data is stored in said data storage step, said network communication step includes a step of communicating with said another device based on the stored data.

13. The communication continuation method according to claim 12, wherein said method allows said first control portion to further execute a step of determining a communication protocol based on said detected data to the communication apparatus at least while said second control portion is not being driven, said network communication step includes a step of communicating with said another device using one of a plurality of communication protocols in response to a request from said another device connected to said network, said communication continuation step includes a plurality of protocol-dependent communication continuation steps executed by said second control portion, corresponding to a plurality of protocols, and when said communication protocol is determined, said reset step includes a step of outputting to said second control portion a reset signal for activating the corresponding communication continuation step that corresponds to said determined communication protocol, among said plurality of protocol-dependent communication continuation steps.

14. The communication continuation method according to claim 12, wherein after transmission of data is enabled, if data is stored in said data storage step, said communication continuation step further includes a step of transmitting data including a reply for continuing communication with said another device, based on the stored data.

15. A communication continuation method executed in a communication apparatus connected to a network to be able to communicate with another device, comprising:

said communication apparatus including a first control portion to communicate with said another device connected to said network, and a second control portion to be driven in response to input of a reset signal from said first control portion and to communicate with said another device through said first control portion, said method allowing said first control portion to execute:

a detection step of detecting data transmitted from said another device connected to said network to the communication apparatus;

a mode switching step of switching an operation mode to a power saving mode in which power consumption is smaller than in a normal mode, if a predetermined condition is met while said operation mode is switched to said normal mode, and switching said operation mode to said normal mode if reception of data to the communication apparatus is detected in said detection step while said operation mode is switched to the power saving mode;

said method allowing said second control portion to execute a network communication step of stopping while said operation mode is switched to the power saving mode, and, if reception of data to the communication apparatus is detected in said detection step, communicating with said another device based on the data detected in said detection step;

said method allowing said first control portion to execute a data storage step of storing the data to the communication apparatus detected in said detection step until communication with said another device is enabled in said network communication step; and said method allowing said first control portion to execute a communication continuation step of transmitting data including a reply for continuing communication with said another device, based on the data to the communication apparatus detected in said detection step, until communication with said another device is enabled in said network communication step, wherein after being driven, if data is stored in said data storage step, said network communication step includes a step of communicating with said another device based on the stored data.

16. The communication continuation method according to claim 15, wherein said communication continuation step includes a step of stopping being driven if said operation mode is switched to the power saving mode, and being activated when said detection step detects reception of data to the communication apparatus.

17. The communication continuation method according to claim 16, wherein after transmission of data is enabled, if data is stored in said data storage step, said communication continuation step further includes a step of transmitting data including a reply for continuing communication with said another device, based on the stored data.

18. The communication continuation method according to claim 15, further comprising a determination step of being driven at least while said operation mode is the power saving mode, to determine a communication protocol based on said detected data to the communication apparatus, wherein said network communication step includes a step of communicating with said another device using one of a plurality of protocols, in response to a request from said another device connected to said network, said communication continuation step includes a plurality of protocol-dependent communication continuation steps corresponding to said plurality of communication protocols, and when said communication protocol is determined, said determination step includes a step of activating only the corresponding communication continuation step that corresponds to said determined communication protocol, among said plurality of protocol-dependent communication continuation steps.

19. A non-transitory computer-readable recording medium encoded with a communication continuation program causing a computer which controls a communication apparatus connected to a network to be able to communicate with another device, said communication apparatus including
a first control portion to communicate with said another device connected to said network, and
a second control portion to be driven in response to input of a reset signal from said first control portion and to communicate with said another device through said first control portion, said program causing said computer to execute processing comprising the steps of:

allowing said first control portion to execute
a detection step of detecting data transmitted to the communication apparatus from said another device connected to said network,
a data storage step of storing the data to the communication apparatus detected in said detection step, and
a reset step of outputting a reset signal to said second control portion in response to detection of the data to the communication apparatus in said detection step;

allowing said second control portion to execute
a step of stopping being driven in response to that a predetermined condition is met, and
a network communication step of communicating with said another device based on the data to the communication apparatus detected in said detection step; and allowing said second control portion to further execute a step of transmitting data including a reply for continuing communication with said another device, based on the data to the communication apparatus detected in said detection step, until communication with said another device is enabled in said network communication step, wherein, after being driven, if data is stored in said data storage step, said network communication step includes a step of communicating with said another device based on the stored data.

20. A non-transitory computer-readable recording medium encoded with a communication continuation program executed in a computer which controls a communication apparatus connected to a network to be able to communicate with another device, said program causing said computer to execute processing comprising:

said communication apparatus including
a first control portion to communicate with said another device connected to said network, and
a second control portion to be driven in response to input of a reset signal from said first control portion and to communicate with said another device through said first control portion, allowing said first control portion to execute:

a detection step of detecting data transmitted from said another device connected to said network to the communication apparatus;

a mode switching step of switching an operation mode to a power saving mode in which power consumption is smaller than in a normal mode, if a predetermined condition is met while said operation mode is switched to said normal mode, and switching said operation mode to said normal mode if reception of data to the communication apparatus is detected in said detection step while said operation mode is switched to the power saving mode;

allowing said second control portion to execute a network communication step of stopping while said operation mode is switched to the power saving mode, and, if reception of data to the communication apparatus is detected in said detection step, communicating with said another device based on the data detected in said detection step;

allowing said first control portion to execute a data storage step of storing the data to the communication apparatus detected in said detection step until communication with said another device is enabled in said network communication step; and allowing said second control portion to execute a communication continuation step of transmitting data including a reply for continuing communication with said another device; based on the data to the communication apparatus detected in said detection step, until communication with said another device is enabled in said network communication step, wherein after being driven, if data is stored in said data storage step, said network communication step includes a step of communicating with said another device based on the stored data.

* * * * *